Patented Dec. 26, 1950

2,535,172

UNITED STATES PATENT OFFICE 2,535,172

DIALKYL 2-ALKOXY-ETHANEPHOSPHONATES AND PROCESS OF PREPARING

Pliny O. Tawney, Passaic, N. J., assignor to United States Rubber Company, New York, N. Y., a corporation of New Jersey No Drawing. Application February 25, 1949, Serial No. 78,459

5 Claims. (Cl. 260—461)

1

This invention relates to certain new organophosphorus compounds and to a method of preparing them. More particularly, the invention relates to compounds resulting from the alkaline catalyzed addition of primary and secondary alcohols to esters of ethenephosphonic acid.

It is an object of my invention to provide new and useful organophosphorus compounds. Another object is to provide a method for the synthesis of such compounds.

The compounds obtained from the practice of my invention are useful as intermediates in the synthesis of other chemicals, and as plasticizers, insecticides, heat transfer agents, lubricants, hydraulic fluids and textile-treating materials.

It is known that, in the presence of alkaline catalysts, compounds containing an active or acidic hydrogen atom may undergo addition reactions with various ethylenically unsaturated compounds such as esters of alpha-unsaturated carboxylic acids, in which the ethylenically unsaturated group is activated by virtue of its conjugated relationship to the carbonyl group. I have now discovered that primary and secondary alcohols will undergo addition reaction with ethylenically unsaturated compounds in which the ethylenic group is in conjugated relationship to the group

It has not heretofore been known that ethenephosphonic acid esters would behave in this way.

Specifically, I have discovered that primary and secondary aliphatic saturated monohydric alcohols will react with dialkyl esters of ethenephosphonic acid to give a series of new and useful organophosphorus compounds. The reaction may be illustrated by the following equation:

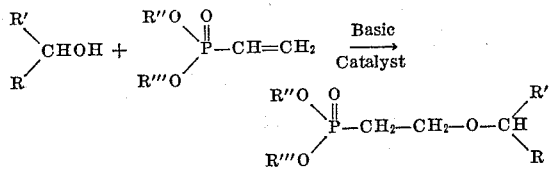

wherein R and R' are selected from the class consisting of hydrogen and alkyl groups and R'' and R''' are alkyl groups.

The addition reaction of my invention is most advantageously carried out by heating the reactants in the presence of a basic catalyst to an elevated temperature which may conveniently range from 65° C. to 150° C. The reaction is often conducted by heating the reactants at the boiling point under reflux.

Any aliphatic saturated monohydric non-tertiary alcohol may be used in the practice of my invention. Examples are methyl, ethyl, n-propyl, isopropyl, n-butyl and sec-butyl alcohols and the primary and secondary amyl, hexyl, heptyl, octyl and higher alcohols. Usually the alcohol will contain from 1 to 20 carbon atoms per molecule.

Any dialkyl ester of ethenephosphonic acid may be used in the practice of my invention. The alkyl groups therein may be the same or different. Examples of alkyl groups include methyl, ethyl, propyl, butyl, amyl, hexyl, heptyl, octyl, etc.

It is preferred to have present either an excess of the alcohol or a suitable added inert diluent (e. g., benzene) in the reaction mixture in order to keep the reaction mixture fluid during the reaction. In the case of the lower alcohols, e. g., methanol, ethanol, isopropanol, etc., it is often preferred to use an excess of alcohol itself to serve as the diluent. In the case of the higher alcohols, which are relatively more expensive, it is often preferred to use an added inert diluent. In either case the reaction is most advantageously carried out at the temperature of reflux of the mixture. In any case it is preferred to use an amount of the alcohol at least equal to that amount which is stoichiometrically equivalent to the dialkyl ester of ethenephosphonic acid. This insures complete utilization of the relatively expensive ethenephosphonic acid ester reactant.

The preferred catalyst is an alkali metal alcoholate of the alcohol used as a reactant. This catalyst is most conveniently made by dissolving the alkali metal in a suitable excess of the alcohol, the resulting solution being used directly in the reaction. Sodium metal is preferred for this purpose. However, other alkali metals such as potassium, lithium, etc. may be used.

Less preferably other basic materials may be used as catalysts in carrying out the addition reaction of the present invention. Examples include oxides and hydroxides of alkali metals, oxides, hydroxides and alcoholates of alkaline earth metals such as calcium, barium, strontium, etc., and organic bases, e. g., amines such as pyridine, piperidine, various quaternary ammonium hydroxides such as trimethyl benzyl ammonium hydroxide, etc.

The reaction is preferably carried out under substantially anhydrous conditions which are easily attained by the use of anhydrous reactants and by carrying out the reaction in such a manner that access of extraneous moisture is prevented.

The reaction is preferably continued until the dialkyl ethenephosphonate has been substantially completely combined. The duration of the reaction may vary widely. Following the attainment of the desired completeness of reaction, the addition reaction product is recovered from the reaction mixture in any suitable manner. In the case of the lower-boiling products, their recovery may conveniently be effected by vacuum distillation.

The following example discloses my invention in more detail. All parts are by weight.

Example

To a solution of 0.1 part of sodium in 7.9 parts of absolute ethyl alcohol, 6.2 parts of diethyl ethenephosphonate are added. The solution is heated under reflux for eighteen hours, and is then distilled in vacuo to obtain 6.6 parts of diethyl 2-ethoxyethanephosphonate, B. P., 96–98 C./2.5 mm.

|  | Per cent C | Per cent H | Per cent P |
|---|---|---|---|
| Analysis: |  |  |  |
| Found | 45.05 | 9.6 | 14.77 |
| Theory | 45.7 | 9.26 | 14.42 |

The amount of catalyst required to effect the reaction is very small, commonly ranging from 0.01 mole to 0.2 mole per mole of the dialkyl ester of ethenephosphonic acid.

Having thus described my invention, what I claim and desire to protect by Letters Patent is:

1. The process which comprises effecting addition reaction of an aliphatic saturated monohydric non-tertiary alcohol and a dialkyl ester of ethenephosphonic acid in the presence of a basic catalyst and thereby forming a compound having the type formula

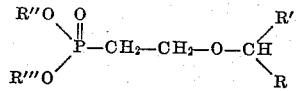

where R and R' are selected from the class consisting of hydrogen and alkyl groups and R'' and R''' are alkyl groups.

2. The process which comprises effecting addition reaction of an aliphatic saturated monohydric non-tertiary alcohol and a dialkyl ester of ethenephosphonic acid by heating a mixture of said alcohol, said ester and an alkali metal alcoholate of said alcohol, and thereby forming a compound having the type formula

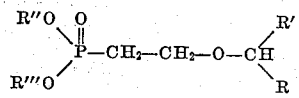

where R and R' are selected from the class consisting of hydrogen and alkyl groups and R'' and R''' are alkyl groups.

3. The process which comprises effecting addition reaction of ethyl alcohol and diethyl ethenephosphonate in the presence of a basic catalyst and thereby forming a compound having the formula

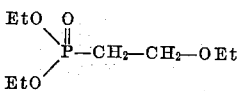

4. A new chemical compound having the type formula

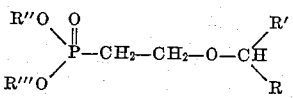

where R and R' are selected from the class consisting of hydrogen and alkyl groups and R'' and R''' are alkyl groups.

5. As a new chemical compound, diethyl 2-ethoxyethanephosphonate.

PLINY O. TAWNEY.

REFERENCES CITED

The following references are of record in the file of this patent:

UNITED STATES PATENTS

| Number | Name | Date |
|---|---|---|
| 2,313,741 | Engelmann et al. | Mar. 16, 1943 |